June 28, 1932.  R. J. McLEOD  1,865,330

FLEXIBLE COUPLING

Filed June 27, 1929  2 Sheets-Sheet 1

Inventor
Robert J. McLeod
By
Attorney

June 28, 1932.    R. J. McLEOD    1,865,330
FLEXIBLE COUPLING
Filed June 27, 1929    2 Sheets-Sheet 2
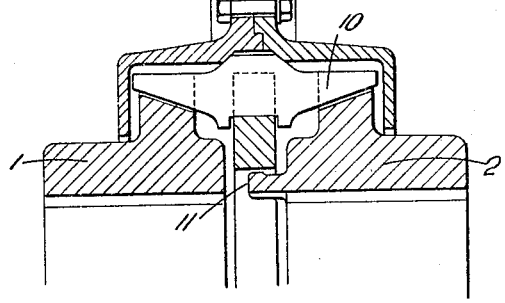
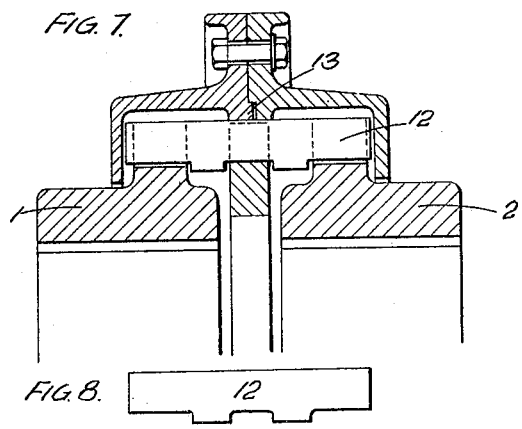
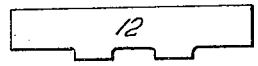
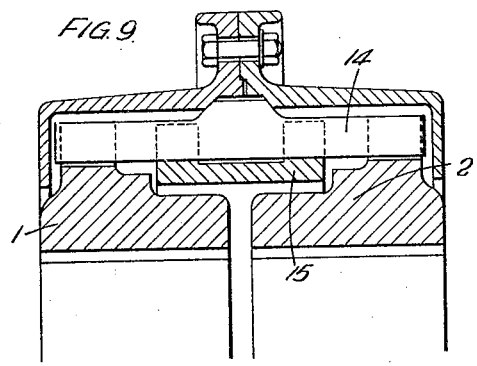
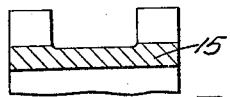
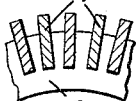
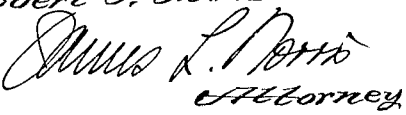
Inventor
Robert J. McLeod
By
Attorney Patented June 28, 1932

1,865,330

UNITED STATES PATENT OFFICE

ROBERT JAMES McLEOD, OF WEST DRAYTON, ENGLAND

FLEXIBLE COUPLING

Application filed June 27, 1929, Serial No. 374,196, and in Great Britain August 11, 1928.

This invention relates to flexible couplings for connecting two coaxial shafts and consists in means by which torsional variations of load and mis-alignments are not transmitted from the driving to the driven shaft, nor from the driven back to the driving shaft.

Variations in load may arise from cyclic variations of torque in the case of reciprocating prime movers, inertia effects due to sudden changes of velocity, shocks originating in the driven element through the nature of the work performed and from other causes. Also, mis-alignment of two coaxial shafts may arise through faulty erection, settlement of foundations or deflection of platforms.

A truly flexible coupling must provide both for relative angular and axial displacements so that the effects of such displacements are not transmitted from one shaft to the other.

The chief objects of the invention are to provide a coupling of the type described, which is of a simple construction, which can be readily assembled and dissassembled, is adapted to transmit large loads at high velocity and in which flat springs, connecting the driving and driven members, carried by an inclinable carrier ring, deflect in the manner of a cantilever the effective length of the springs decreasing as the load increases.

Fig. 1 of the accompanying drawings shows partly in section a complete coupling according to the invention.

Fig. 5 shows in section a modified construction and

Fig. 6 is a view of the spring.

Fig. 7 is a section of a further modification.

Fig. 8 shows separately the form of spring used in Fig. 7.

Fig. 9 is a section of a still further modification and

Figs. 10 and 11 show details of construction.

Figure 1:
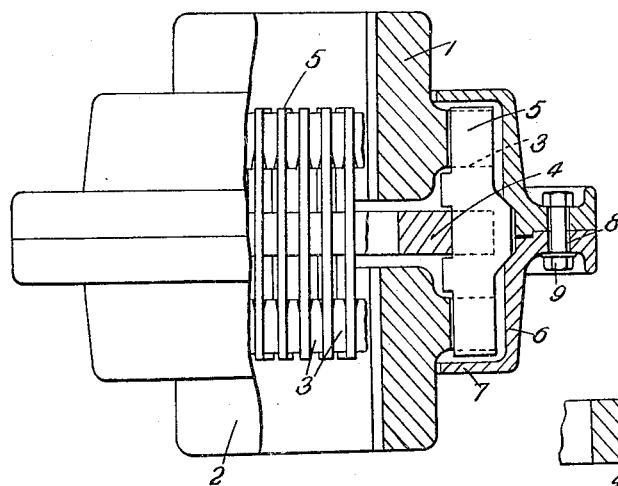
Figure 3:
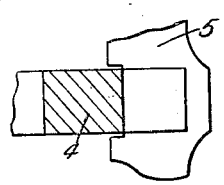
Figs. 3 and 4 show details of construction on a larger scale of the elements of the coupling.
Figure 4:
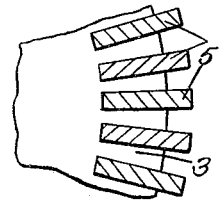
Figure 2:
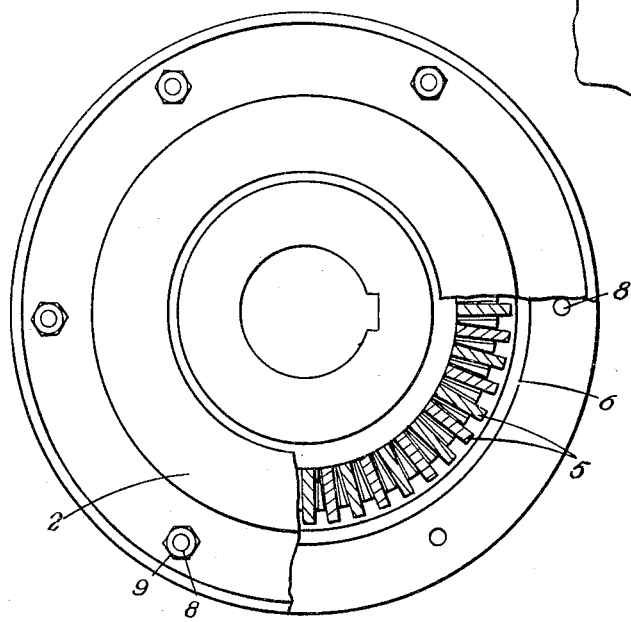
Fig. 2 is an end view partly cut away to show the disposition of the springs.

Referring to the coupling shown in Figs. 1-4, 1 and 2 are the coupling discs, each disc being bored and keywayed to suit its respective shaft; each disc is provided with axially disposed teeth 3 shaped on either side to form a portion of a parabola. Between the discs 1 and 2 is placed a carrier ring 4, provided with parallel axial slots equal in number to the spaces between the teeth and slightly narrower than the narrow remote end of these spaces.

Into each slot of the carrier ring is driven a flat spring 5, or a set of thin flat springs, each spring fitting slidably in the spaces between the axial teeth.

It will be seen that each spring 5 is bevelled at the central portion of its outer surface and projects beyond the carrier ring 4. A cover ring 6, made in halves and provided with an inwardly projecting rim 7, is bevelled to suit the springs and acts as a retaining ring for the springs and carrier. The two parts of the cover ring are secured together by bolts 8 and nuts 9.

Figs. 5 and 6 show at 10 an alternative form of spring designed to give greater flexibility. An abutment 11 is provided on one half of the coupling to form a seating on which the carrier ring is inclinably supported. This is useful at very high velocities.

Figs. 7 and 8 show at 12 another form of spring. In this form the spring is retained in position by the outer flat side engaging with an inwardly projecting surface 13 of the cover ring.

In Fig. 9 the carrier ring 15 is provided with two rows of slots and the teeth in the halves 1, 2 of the coupling are arranged at the ends remote from each other; in this arrangement, details of which are shown in Figs. 10 and 11, the springs 14 are longer and afford greater flexibility.

From the foregoing description it will be seen that the flexure of each spring will be from the tooth of the driving half of the coupling to the carrier ring and from the carrier ring to the tooth of the driven half of the coupling.

The possible maximum movement is, therefore, considerable, and, as the axial teeth are preferably of a parabolic contour, when the springs deflect in the manner of a cantilever, the teeth will engage with a greater length of the spring, progressively shortening the effective length of the spring and progressively offering greater resistance to deflection, the coupling thereby accommodating itself to overload conditions.

As the springs engage slidably between the axial teeth and as they form the only connection between the two halves of the coupling, the one half may be offset slightly or inclined axially without disturbing the efficiency of the coupling.

The coupling can be lubricated by means of oil carried in the cover ring up to the level of the coupling boss.

I claim:

1. A flexible coupling for connecting the coaxial shafts of a driving and a driven member, comprising two discs for connection, respectively, to such members, each of said discs having axially disposed teeth, a carrier ring loosely mounted between the discs and having axial slots, and flat springs inserted in said slots and engaging with the teeth of each disc, one of said discs having a seating integral therewith on which the carrier ring is supported.

2. A flexible coupling for connecting the coaxial shafts of a driving and driven member, comprising two discs secured, respectively, to the said members, each of said discs having axially disposed teeth of parabolic contour, a carrier ring loosely mounted between said discs and having closely spaced narrow axial slots, flat metal springs inserted in said slots and engaging with the teeth of each disc, and a cover ring preventing radial displacement of said springs, one of said discs having a seating formed integrally therewith on which said carrier ring is supported.

In testimony whereof I have signed my name to this specification.

ROBERT JAMES McLEOD.